United States Patent
Taguchi et al.

(10) Patent No.: US 6,846,475 B1
(45) Date of Patent: Jan. 25, 2005

(54) HYDROGEN REFINEMENT APPARATUS

(75) Inventors: Kiyoshi Taguchi, Moriguchi (JP);
Takeshi Tomizawa, Ikoma (JP);
Kunihiro Ukai, Ikoma (JP); Toshiyuki Shono, Kyoto (JP); Kouichiro Kitagawa, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/549,918

(22) Filed: Apr. 14, 2000

(30) Foreign Application Priority Data

Apr. 22, 1999 (JP) .......................................... 11-115101

(51) Int. Cl.[7] ............................... C01B 3/16; B01J 8/02
(52) U.S. Cl. ....................... 423/656; 422/177; 422/180; 422/190; 422/211; 422/222; 423/655
(58) Field of Search ................................ 423/655, 656; 422/177, 190, 211, 180, 222

(56) References Cited

U.S. PATENT DOCUMENTS

| | | | |
|---|---|---|---|
| 3,387,942 A | | 6/1968 | Habermehl |
| 3,872,025 A | * | 3/1975 | Singleton .................... 252/373 |
| 4,711,773 A | | 12/1987 | Mesters et al. |
| 5,030,440 A | * | 7/1991 | Lywood et al. ............. 423/655 |
| 5,830,425 A | * | 11/1998 | Schneider et al. .......... 423/656 |
| 6,103,660 A | * | 8/2000 | Yperen et al. .............. 423/628 |
| 6,110,862 A | * | 8/2000 | Chen et al. ................. 502/326 |
| 6,129,904 A | * | 10/2000 | Von Thienen et al. ...... 423/627 |
| 6,375,924 B1 | * | 4/2002 | Towler et al. ............... 423/656 |
| 6,524,550 B1 | * | 2/2003 | Chintawar et al. .......... 423/652 |

FOREIGN PATENT DOCUMENTS

| | | | |
|---|---|---|---|
| EP | 0 002 791 A | | 7/1979 |
| EP | 0 361 648 A1 | | 4/1990 |
| GB | 2240284 | * | 7/1991 |
| JP | SHO39-29435 | | 12/1964 |
| JP | SHO 50-84490 | | 7/1975 |
| JP | 58-161901 | | 9/1983 |
| JP | 02-069301 | | 3/1990 |
| JP | 05-258764 | | 10/1993 |
| JP | 06140068 A | | 5/1994 |
| JP | 06290801 A | | 10/1994 |
| JP | 10-236802 | | 9/1998 |

OTHER PUBLICATIONS

Lee, "Effect of Basic Additives on $Pt/Al_2O_3$ for CO and Propylene Oxidation under Oxygen–Deficient Conditions," Ind. Eng. Chem. Res., vol. 36, No. 5, 1997, pp. 1498–1506, (No month).

Pirault, "Catalystic activity and EXAFS characterization of three way automative Pt– $Rh/Al_2O_3$–$CeO_2$ catalysts from different preparations," Applied Catalysis, A:General, 172, pp. 249–258, (1998). (no month).

Ozawa, "Role of cerium–zirconium mixed oxides as catalysts for car pollution: A short review," J. Alloys and Compounds, 275–277, pp. 886–890, (1998). (no month).

(List continued on next page.)

Primary Examiner—Wayne A. Langel
(74) Attorney, Agent, or Firm—Akin Gump Strauss Hauer & Feld, LLP

(57) ABSTRACT

The present specification disclosed a hydrogen refinement apparatus comprising a reformed gas feeding part containing at least a hydrogen gas and water vapor, and a reaction chamber equipped with a carbon monoxide shifting catalyst body downstream said reformed gas feeding part, wherein said carbon monoxide shifting catalyst body comprises a carrier supporting Pt, the carrier being composed of at least one metal oxide having a BET specific surface area of 10 $m^2$/g or more, and a method for operating the apparatus. The present invention provides improved heat-resistance of the CO shifting catalyst body, and can operate stably even if the apparatus is activated and stopped repeatedly.

14 Claims, 2 Drawing Sheets

OTHER PUBLICATIONS

E. Xue, et al., "Water–Gas Shift Conversion Using A Feed With A Low Steam To Carbon Monoxide Ratio And Containing Sulphur", *Catalysis Today*, 30:107–118, (1996). (no month).

Mendelovici, Leonardo, et al., "Methanation and Water–Gas Shift Reactions Over $Pt/CeO_2$", *Journal of Catalysis*, 96:285–287, (1985). (no month).

"Petroleum" JPI pp. 109–114, (1977). (no month).

* cited by examiner

HYDROGEN REFINEMENT APPARATUS

BACKGROUND OF THE INVENTION

The present invention relates to a hydrogen refinement apparatus, which refines a reformed gas containing hydrogen as the main component and, in addition, CO and provides a hydrogen gas of high purity.

As the hydrogen source for a fuel cell, a reformed gas obtained by reforming hydrocarbons, alcohols, ethers and the like. In the case of a solid polymer type fuel cell operating at a lower temperature of 100° C. or less, there is a fear that a Pt catalyst used in an electrode is poisoned by carbon monoxide (CO) contained in the reformed gas. When a Pt catalyst is poisoned, the reaction of hydrogen is disturbed and the power generation efficiency of the fuel cell decreases remarkably, therefore, it is necessary to lower the concentration of CO to 100 ppm or less, preferably 10 ppm or less.

Usually, for removal of CO, CO and water vapor are subjected to a shift reaction for conversion into carbon dioxide and hydrogen, in a CO shifting part equipped with a CO shifting catalyst body. By this conversion, the CO concentration can be reduced to a concentration of about several thousands ppm to about 1%. Then, CO is removed to about 10 ppm level causing no adverse influence on the fuel cell, by adding a slight amount of air and utilizing a CO selective oxidation catalyst body.

Herein, for sufficient removal of CO, it is necessary to charge oxygen in an amount of 1 to 3-fold of the amount of CO to the above-mentioned CO selective oxidation catalyst body, and hydrogen is also consumed in an amount corresponding to the amount of oxygen. That is, when the CO concentration is high, the amount of oxygen to be added also increases and the amount of hydrogen consumed increases, leading to significant reduction in the efficiency of the whole apparatus. Therefore, it is necessary to decrease sufficiently CO in the CO shifting part.

Conventionally, there have been used, as the CO shifting catalyst, copper-zinc-based catalysts, copper-chromium-based catalysts and the like for lower temperatures, which can be used at 150 to 300° C., and iron-chromium-based catalysts and the like for higher temperatures, which can function at 300° C. or more. Further, there have been used CO shifting catalysts singly, or combinations of CO shifting catalysts for higher temperatures and for lower temperatures, depending on use conditions for chemical plants and hydrogen generating apparatuses for fuel cell.

When the above-mentioned copper-based CO shifting catalysts for lower temperatures are used as the main catalyst, extremely high catalytic activity is obtained, however, there is a need to perform reduction treatment before use to give activation. Further, due to heat generation during the activation treatment, the treatment has to be conducted over a long period of time while controlling the feeding amount of a reduction gas, for example, so that the temperature of the catalyst does not exceed the heat-resistant temperature. Moreover, there is a possibility that a CO shifting catalyst once activated is oxidized again and deteriorated when oxygen is introduced into the apparatus in stopping and the like. Therefore, countermeasures are required such as prevention of oxidation. Also, since the CO shifting catalyst for lower temperatures is inferior in heat-resistance, and the catalyst can not be heated steeply or acutely in starting the apparatus, it is required to increase the temperature gradually.

On the other hand, when only the CO shifting catalyst for higher temperatures is used, heating in starting has no difficulty, since there is no problem when the temperature increases somewhat excessively due to high heat-resistance thereof. However, since the CO shifting reaction is an equilibrium reaction depending on temperature, when a CO shifting catalyst functioning only at higher temperatures is used, it is difficult to control the CO concentration of a shifted gas to 1% or less. In addition, there is also a problem that purification efficiency lowers in a CO purification part connected to the downstream of the CO shifting part.

As described above, since a longer time is necessary for activation of a shifting part in a hydrogen generating apparatus and handling of the shifting part is complicated in conventional technologies, a hydrogen generating apparatus suitable for frequent repetition of starting-up and stopping cannot be provided.

Accordingly, an object of the present invention is to solve the above-mentioned problems and, in concrete, to provide a hydrogen refinement apparatus, in which activation treatment of a CO shifting catalyst is easy and influences by oxygen introduction during the repetition of starting-up and stopping of operation are decreased, and which operates stably for a longer period of time.

BRIEF SUMMARY OF THE INVENTION

The present invention relates to a hydrogen refinement apparatus comprising a reformed gas feeding part for feeding a reformed gas containing at least a hydrogen gas and water vapor and a reaction chamber equipped with a carbon monoxide shifting catalyst body positioned downstream from said reformed gas feeding part, wherein said carbon monoxide shifting catalyst body comprises a carrier composed of at least one metal oxide having a BET specific surface area of 10 $m^2/g$ or more and Pt supported or carried thereon.

It is effective that the BET specific surface area of the above-mentioned carrier is 250 $m^2/g$ or less.

Further, it is effective that the above-mentioned metal oxide is at least one oxide of one selected from the group consisting of Mg, Al, Si, Ca, Ti, Cr, Fe, Zn, Y, Zr, Nb, Mo, Sn, Ba and lanthanoid.

Furthermore, it is effective that the above-mentioned metal oxide is an oxide containing Ce.

In the case, it is effective that the above-mentioned metal oxide further contains Zr.

Further, in the hydrogen refinement apparatus of the present invention, it is effective that the above-mentioned carbon monoxide shifting catalyst body comprises a carrier supporting Pd, Rh or Ru in an amount of 0.1 to 0.5% by weight based on Pt, in addition to Pt.

Also, the present invention relates a method for operating the above-mentioned hydrogen refinement apparatus. Namely, the present invention relates to a method for operating a hydrogen refinement apparatus comprising a reformed gas feeding part for feeding a reformed gas containing at least a hydrogen gas and water vapor, and a reaction chamber equipped with a carbon monoxide shifting catalyst body positioned downstream from said reformed gas feeding part; aforementioned carbon monoxide shifting catalyst body comprising a carrier composed of at least one metal oxide having a BET specific surface area of 10 $m^2/g$ or more and Pt supported thereon, wherein the temperature of aforementioned carbon monoxide shifting catalyst body is controlled from 150 to 450° C.

In this method, it is effective to control the temperature of the upstream side part of the above-mentioned carbon monoxide shifting catalyst body higher than that of the downstream side part of the carbon monoxide shifting catalyst body.

Further, it is effective to feed a reformed gas containing 24 to 50% by volume of water vapor.

DETAILED DESCRIPTION OF THE INVENTION

The present invention will be illustrated with the following typical embodiments, by referring to drawings.

Figure 1:
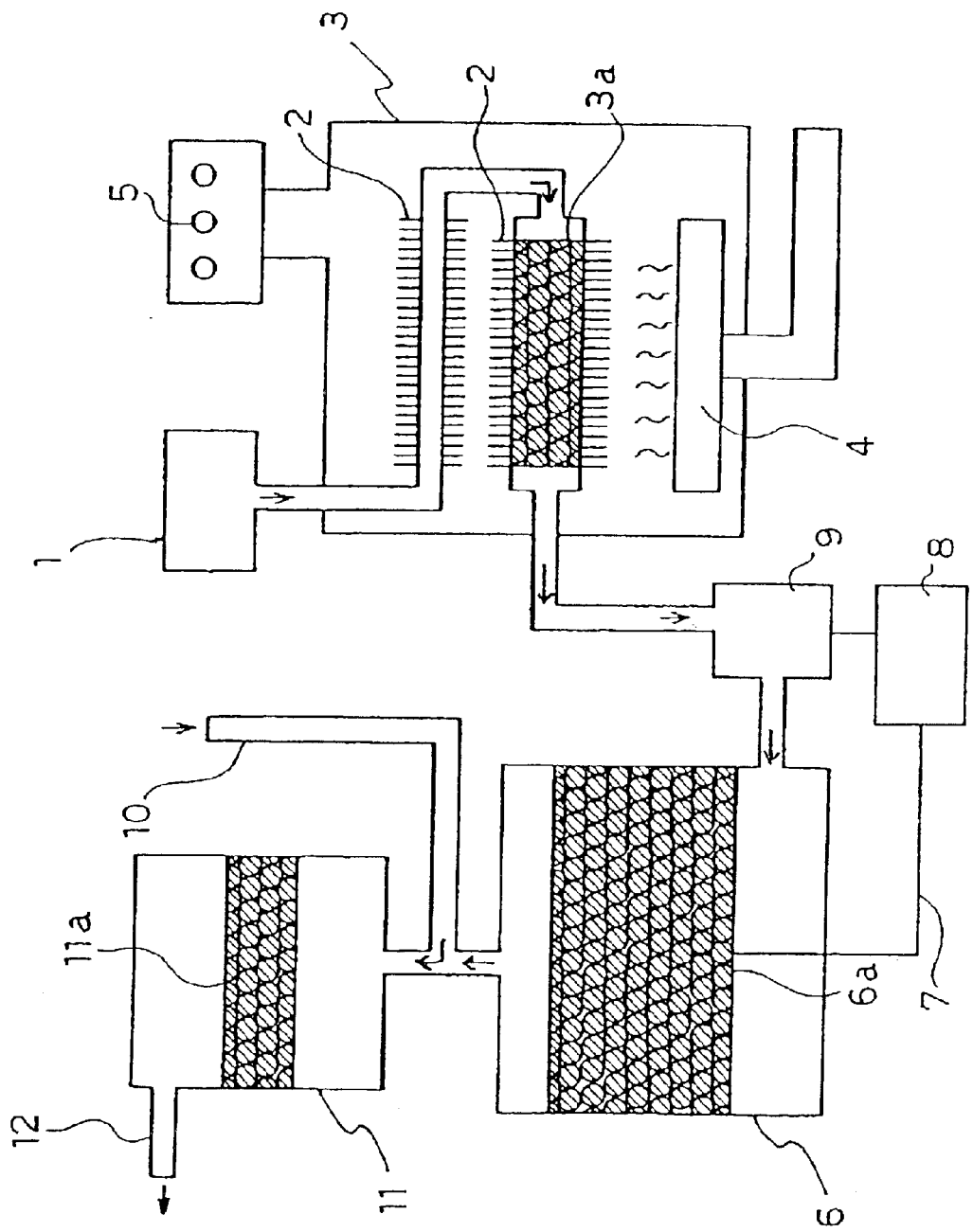
FIG. 1 is a schematic longitudinal sectional view showing the constitution of a hydrogen generating apparatus containing a hydrogen refinement apparatus of the present invention.

FIG. 1 is a schematic longitudinal sectional view showing the constitution of a hydrogen generating apparatus containing a hydrogen refinement apparatus of the present invention. In FIG. 1, a raw material gas feeding part 1 feeds a raw material gas comprising a fuel and water vapor. This hydrogen generating apparatus comprises a reforming reaction chamber 3, CO shifting chamber 6 and CO purifying chamber 11. The apparatus further comprises a heat exchange fin 2, reforming catalyst body 3a, heating burner 4, exhaust port 5, CO shifting catalyst body 6a, thermocouple 7, temperature controller 8, cooler 9, air feeding part 10. CO purifying catalyst body 11a and discharge port 12. The periphery of necessary portions of the reaction chamber may be covered with a heat insulating material composed of ceramic wool to keep the reaction chamber at constant temperature (not shown).

Figure 2:
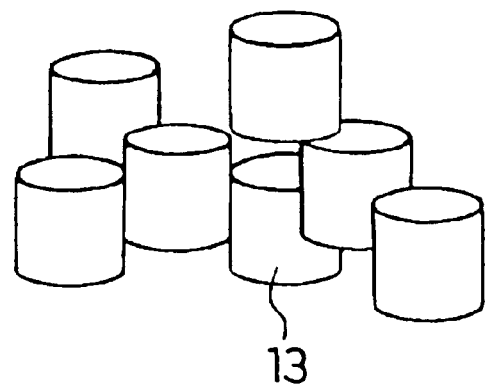
FIG. 2 is a schematic perspective view of the carriers in the form of a pallet.

The CO shifting catalyst body 6a is prepared by impregnating an alumina carrier in the form of a pellet shown in FIG. 2 with a Pt salt. As the reforming catalyst body 3a, a Ni-based catalyst usually used is employed, and as the CO purifying catalyst body 11a, a Pt-based catalyst is used.

In FIG. 1, the reforming catalyst body 3a and the CO purifying catalyst body 11a are also shown for explanation of the basic mechanism of the hydrogen refinement apparatus of the present invention.

Then, operations and properties of the hydrogen generating apparatus containing the hydrogen refinement apparatus of the present invention will be described. In the hydrogen generating apparatus shown in FIG. 1, the hydrogen refinement apparatus of the present invention corresponds to the CO shifting chamber 6.

As the fuel used for generating a reformed gas to be fed to the hydrogen refinement apparatus, there are natural gas, methanol, gasoline and the like for example. As the reforming method, there are a vapor reforming method in which water vapor is added, a partial reforming method in which air is added, and the like. In this example, a case will be described in which natural gas is vapor-reformed to obtain a reformed gas.

A mixture of natural gas and water vapor is fed from the raw material gas feeding part 1 and preheated by passing through a route heat-exchanged by the heat exchange fin 2 and, then, allowed to contact with the reforming catalyst body 3a. The reforming catalyst body 3a has been heated at 500 to 800° C. by the heating burner, and the raw material gas is converted into hydrogen and CO and carbon dioxide at a conversion ratio of approximately 100%.

The composition of the reformed gas somewhat changes depending on the temperature of the reforming catalyst body 3a. Usually, in terms of the average composition excepting water vapor, the reformed gas contains about 80% of hydrogen, about 10% of carbon dioxide and about 10% of carbon monoxide. This reformed gas is fed to the CO shifting catalyst body 6a, to cause a reaction of CO with water vapor. Since the CO shifting catalyst body 6a functions at about 150 to 450° C. while the reforming catalyst body 3a functions at about 500 to 800° C., the temperature of the reformed gas is controlled to make the temperature of the CO shifting catalyst body 6a optimum by detecting the temperature of the upstream side part of the CO shifting catalyst body 6a with the thermocouple 7 and controlling the output of a cooling fan attached to the cooler 9 with the temperature controller 8 having feed back mechanism.

The CO concentration of the gas (shifted gas) after passing through the CO shifting catalyst body 6a is about 0.5%. Therefore, after mixing the shifted gas with air containing an oxygen in an amount corresponding to 3-fold of the CO concentration of the shifted gas, the mixed gas is fed to the CO purifying catalyst body 11. In the CO purifying catalyst body 11, CO is removed to a level of 10 ppm or less, and the gas is fed through the discharge port 12 to a fuel cell.

Then, the operation theory of the hydrogen generating apparatus containing the hydrogen refinement apparatus of this example will be described. In this embodiment, the CO shifting catalyst body 11a, which is the feature of the present invention, will be illustrated in detail.

The CO shifting reaction is an equilibrium reaction depending on temperature, and the CO concentration can be decreased further when the reaction is conducted at lower temperature. On the other hand, the reaction rate is decreased at lower temperature, there exists a temperature at which the CO concentration is decreased as lowered as possible. Usually, copper-based shifting catalysts such as copper-zinc catalysts, copper-chromium catalysts and the like used as the CO shifting catalyst can cause a CO shifting reaction at around 150 to 250° C. Further, the CO concentration can be decreased to about from several hundreds to several thousands ppm depending on conditions. However, copper-based catalysts have to be activated by passing through of a reduction gas such hydrogen or reformed gas after filled in a reaction chamber, and the heat resistance of the copper based catalysts is as low as around 300° C. Therefore, so as not to exceed the heat-resistant temperature by the reaction heat in activation, the reduction gas should be diluted with an inert gas and the like before feeding, or the reaction should be proceeded gradually at a lower flow rate, requiring a longer period of time. Also in starting-up of an apparatus, heating should be effected slowly over a long period of time so as not to exceed the heat-resistant temperature by surplus heat increase, and a lot of problems occur in a use with a frequent repetition of starting-up and stopping.

While in the hydrogen refinement apparatus of the present invention, a Pt catalyst is used as the CO shifting catalyst body 6 and this catalyst has higher heat-resistance as compared with copper-based catalysts, therefore, no significant deterioration occur even in the case of high temperatures around 500° C. in starting-up of the apparatus. Further, there is no need for activation for a long period of time in a reduction gas like in the case of copper-based catalysts. Even if air is introduced into an apparatus when the apparatus is stopped, no catalyst deterioration due to oxidation occur as in case of the copper-based catalyst.

Usually, noble metal catalysts have high activity against various reactions, and exhibits sufficient activity even at a smaller amount the noble metal supported on a carrier, as compared with catalysts using transition metals. Further, noble metals tend to be reduced due to small production heat of oxides thereof, and generate small heat when activated with a reduction gas. Consequently, Pt catalysts need no activation over a long period of time while passing a reduction gas as in case of the copper-based catalysts, and can provide sufficient activity only if a reformed gas is allowed to pass for several minutes after filling of the catalyst.

Any of noble metal catalysts such as Pt, Pd, Rh, Ru and the like can cause a CO shifting reaction, however, the reaction selectivity thereof is relatively low due to the high activity. Further, a methanization reaction of CO or carbon dioxide proceeds as the side reaction of the CO shifting reaction, depending on conditions. When the methanization reaction proceeds, hydrogen is consumed to decrease efficiency of the whole apparatus. Usually, in the temperature range from 150 to 450° C. in which the CO shifting reaction is conducted, the methanization reaction proceeds further at higher temperatures, and the methane yield varies also depending on the kind of a noble metal. The reason for this is that a CO adsorption mechanism varies depending on the kind of a noble metal. In case of the Pd, Rh and Ru, the temperature range, in which a CO shifting reaction easily proceeds, is narrow because Pd, Rh and Ru having the CO adsorption mechanism facilitating the methanization reaction generate methane at relatively lower temperature.

Contrary thereto, the Pt catalyst used in the present invention does not easily cause a methanization reaction, and can provide a CO shifting reaction in a wider temperature range.

For obtaining sufficient catalyst activity, it is necessary to make the size of a Pt particle smaller and to provide the particle with a lot of active points. For this purpose, it is preferable that Pt is supported on a metal oxide having a BET specific surface area of 10 $m^2/g$ or more. In the present invention, the BET specific surface area means a specific surface area measured by a known measuring method, in which nitrogen is adsorbed on a powder. Though there is no limitation on the upper limit of the BET specific surface area, it is preferably from 10 to 250 $m^2/g$.

The metal oxide for the carrier, which supports Pt, is preferably at least one oxide of one selected from the group consisting of Mg, Al, Si, Ca, Ti, Cr, Fe, Zn, Y, Zr, Nb, Mo, Sn, Ba and lanthanoid. That is, the metal oxide may be a complex metal oxide containing a plurality of metal elements.

On the contrary, when a metal oxide of Cu, Mn, Co, Ni and the like which are not included in the above-mentioned group is used, the effect of the present invention can not be obtained due to heat generation by reduction with a reformed gas after filling of the catalyst as in the case of a Cu-based CO shifting catalyst.

When the BET specific surface area of a metal oxide and complex metal oxide is less than 10 $m^2/g$, Pt is not fully adsorbed, the degree of dispersion of Pt decreases, consequently, no sufficient catalyst activity is obtained. Further, when the amount of supported Pt is reduced to decrease the particle size of Pt, the number of active points decreases and sufficient activity is not obtained.

Examples of specific metal oxides include alumina, silica, silica alumina, zirconia, titania, zeolite and the like, particularly from a viewpoint that high activity can be obtained. These metal oxides may be used alone, respectively, or in combination of two or more in a ratio, which does not deteriorate the effect of the present invention.

The reason for high activity of these metal oxides is that these oxides relatively stable against alkalis and do not change by an acidic or basic Pt salt. If a metal oxide and the like change by a Pt salt, Pt is buried into the metal oxide and the like to reduce the activity.

Further, the above-mentioned metal oxide is preferably an oxide containing Ce. The reason why cerium oxide is preferable will be explained below. In cerium oxide, the difference between trivalent Ce and tetravalent Ce is small, and they are easily oxidized and reduced. Accordingly, it is known that oxygen in cerium oxide easily transfers in the lattice, and easily react simultaneously. On the other hand, since Pt is facilitated to adsorb CO, when Pt is supported or carried on cerium oxide, the adsorbed CO reacts with oxygen in cerium oxide to give carbon dioxide. The source of oxygen thus consumed is in air in usual air atmosphere, while the source is water vapor in a reformed gas atmosphere. Therefore, in a hydrogen refinement apparatus, a water molecule is deprived of oxygen and release hydrogen therefrom. Namely, an aqueous gas shift reaction will proceed in which CO reacts with water vapor to produce carbon dioxide and hydrogen. That cerium oxide is facilitated to have a hydroxyl group on the surface thereof is a cause promoting depriving oxygen from water vapor. As apparent from the above-mentioned description, due to necessity of contact of Pt with cerium oxide, Pt is dispersedly supported on a cerium oxide carrier having high specific surface area, to obtain high ability. Also, Ce has effects to suppress or inhibit a methanization reaction on a Pt catalyst and to improve activity at lower temperatures against a CO shifting reaction.

Further, when cerium oxide is combined with zirconia (Zr), lanthanum (La) and/or zinc (Zn) and the like, lattice failures increase facilitating transfer of oxygen in the lattice. In other words, in an oxide of cerium and Zr, La and/or Zn, oxygen transfers easily. Also, the heat resistance of cerium oxide having relatively low heat resistance can be improved.

As the raw material of Ce, nitrate salts, acetate salts, hydroxides and the like are exemplified. However, when the addition amount of Ce is large, the BET specific surface area of a metal oxide may be less than 10 $m^2/g$ depending on the preparation method, and in this case, high activity is not obtained.

As described above, since cerium oxide itself has relatively low heat resistance, the heat resistance is improved by combination with Zr. Namely, composite metal oxides containing Ce and Zr are preferable. Also, there is no specific restriction on the method to combine cerium oxide with Zr, and there can be used, for example, a co-precipitation method, sol-gel method, alkoxide method and the like. Further, Zr may be incorporated into cerium oxide, or cerium may be incorporated into zirconium oxide.

Further, when one selected from Pd, Rh and Ru is added in an amount of 0.1 to 0.5 fold based on the weight of Pt, further higher activity is obtained. Since these noble metal elements facilitate a methanization reaction, they alone cannot easily obtain higher ability as the CO shifting catalyst, but combination thereof with Pt can improve the ability of a Pt catalyst. For smooth reaction of CO on the Pt, there needs some active points remained on the Pt. However, CO has higher affinity to Pt than the other molecules and tends to close the active points on the Pt. Such tendency is remarkable as the temperature is lower. By adding the slight amount of Pd, Rh and/or Ru, the above-mentioned phenomenon can be inhibited.

When these noble metals are added in an amount of more than 0.5-fold based on the weight of Pt, properties of the noble metals emerge and the methanization reaction becomes remarkable, preferably, and when less than 0.1-fold based on the weight of Pt, the effect of addition does not appear at all.

The hydrogen refinement apparatus of the present invention exhibits particularly high ability if the temperature of the CO shifting catalyst body 6a is controlled from 150 to 450° C. In the CO shifting reaction, the CO concentration decreases further at lower temperature from the equilibrium point of view. And, when over 450° C., the CO concentration cannot be fully decreased and an amount of the methane generated increases to reduce the efficiency of hydrogen generation. On the other hand, at a lower temperature of less than 150° C., the CO concentration increases from the viewpoint of the reaction rate.

Further, when the temperature of the downstream side part of the CO shifting catalyst body 6a is controlled to be lower than the temperature of the upstream side part thereof by cooling the downstream side part of the CO shifting catalyst body 6a, particularly high ability is obtained. Since the CO shifting reaction is an exothermic reaction, the reaction heat generated in the upstream side part of the CO shifting catalyst body 6a is transmitted via the reformed gas to the downstream side part. Therefore, the temperature of the downstream side part of the CO shifting catalyst body 6a is easy to be higher than that of the upstream side part, and even if the CO concentration is fully decreased in the upstream side part, the CO concentration increases in the downstream side part having higher temperature again by a reverse reaction. Therefore, by controlling the temperature of the downstream side part to be lower than the temperature of the upstream side part, the reverse reaction can be suppressed or inhibited.

Herein, the temperature of the upstream side part of the CO shifting catalyst body 6a and the temperature of the downstream side part of the CO shifting catalyst body 6a are average temperatures of the upstream side half and the downstream side half, respectively, or in the case of division into the upstream, middle stream and downstream, the average temperatures of the upstream and downstream, respectively. When the temperature of the most upstream part lowers exceptionally by cooling only the most upstream part, the average temperature of the upstream part excepting the this most upstream part is regarded as the temperature of the upstream part.

Further, when the amount of water vapor contained in a reformed gas is from 24 to 50% by volume, particularly high activity is obtained. It is more preferable from the equilibrium point of view when the average content of water vapor in the reformed gas is higher, and specifically, the CO concentration fully decreases when water vapor is contained in an amount of 24% by volume or more. On the other hand, when the water vapor content increases, the flow rate increases causing a disadvantage in the reaction rate, and specifically, when the content is more than 50% by volume, the CO concentration cannot be decreased sufficiently.

The amount of water vapor contained in a reformed gas can be controlled by the amount of feeding water since the water vapor amount can be increased by addition of water at intermediate part between a reforming chamber and a shifting chamber.

In this embodiment, the case has been illustrated in which a carrier is in the form of a pellet, and the CO shifting catalyst body 6a is produced by impregnation of a Pt salt, however, the CO shifting catalyst body 6a may be obtained by making a slurry of a catalyst body, which had been prepared previously by supporting Pt onto an alumina powder, and by coating this slurry on a carrier composed of a heat-resistant metal material such as cordierite, mullite and the like. Also in this case, a shifting catalyst body having the same ability is obtained. In this case, the amount of a metal powder may be decreased for coating only on the surface. Alternatively, by using a material having strong heat impact-resistance as the carrier, cracking or break of a catalyst body caused by heat impact due to starting-up and stopping is inhibited.

Figure 3:
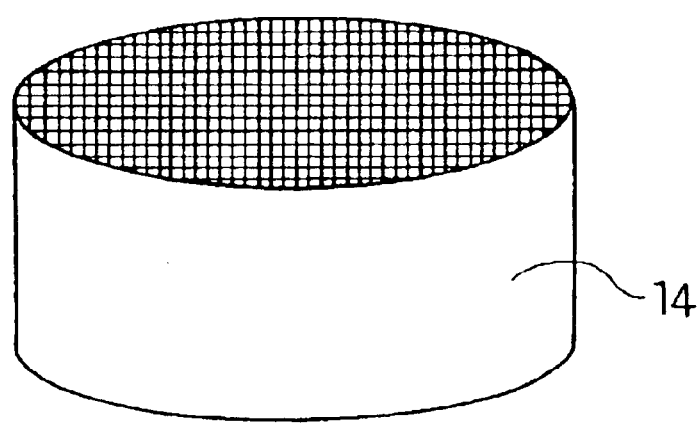
FIG. 3 is a schematic perspective view of a carrier in the form of a honeycomb.

Further, also the carrier may be in the form of honeycomb as shown FIG. 3 in addition to the pellet form described above. In the case of honeycomb form, geometrical surface area per unit volume increases and contact area between the CO shifting catalyst body and the reformed gas increases, consequently, more efficient reaction can be conducted. In the case of a carrier in the form of a pellet, it is also possible that a catalyst is filled in a column and the like and a reformed gas is passed through it to carry out the shift reaction.

Moreover, there is no specific restriction also on the catalyst constituting the reforming catalyst body 3a, and those catalysts which can reform a fuel such as noble metal-based catalysts, other transition metal-based catalysts and the like can be widely used. Also as the fuel and reforming method, other fuels may be used, and a partial reforming method in which a part of a fuel is oxidized by addition of air may be used.

The following examples illustrate the present further in detail below but the present invention is not limited thereto.

EXAMPLE 1

Metal oxides or composite metal oxides 1 to 34 having compositions shown in Table 1 were molded into pellets having a diameter of 6 mm and a height of 3 mm. Then, these pellets were mixed into a 4 wt % (on the basis of Pt weight) solution of dinitrodiammineplatinum ($Pt(NO_2)_2(NH_3)_2$) in nitric acid, placed in an electric oven as they were, and sintered at 500° C. for 1 hour in air to prepare CO shifting catalyst bodies comprising samples 1 to 34. The BET specific surface areas of these samples measured previously are shown in Table 1.

Then, the samples 1 to 34 were used as the CO shifting catalyst body 6a in the hydrogen refinement apparatus shown in FIG. 1, and the catalytic abilities thereof were evaluated.

First, methane, which is the main component of natural gas, was used as a fuel and water vapor in a volume 3-fold based on methane was mixed and introduced into the raw material gas feeding part 1. The reformed gas after passing through the heated reforming catalyst body 3a contained 80% of hydrogen, 11% of CO and 9% of carbon dioxide. The content of water vapor was measured by the dew point of the reformed gas to find it was 25%. This reformed gas was fed to the CO shifting catalyst body 6a, and the CO concentration of the shifted gas after passing through the CO shifting catalyst body 6a was measured by gas chromatography. The results are shown in Table 1.

TABLE 1

| Sample No. | (Composite) Metal oxide | BET specific surface area ($m^2/g$) | CO conc. (%) |
|---|---|---|---|
| 1 | MgO | 52 | 0.30 |
| 2 | $Al_2O_3$ | 121 | 0.20 |
| 3 | $SiO_2$ | 84 | 0.25 |
| 4 | CaO | 32 | 0.50 |
| 5 | $TiO_2$ | 93 | 0.20 |
| 6 | $Cr_2O_3$ | 41 | 0.30 |
| 7 | $Fe_2O_3$ | 21 | 0.80 |
| 8 | ZnO | 74 | 0.40 |
| 9 | $Y_2O_3$ | 42 | 0.60 |
| 10 | $ZrO_2$ | 111 | 0.15 |
| 11 | $NbO_2$ | 86 | 0.30 |
| 12 | $MoO_3$ | 15 | 0.80 |
| 13 | $SnO_2$ | 35 | 0.70 |
| 14 | BaO | 12 | 0.90 |
| 15 | $La_2O_3$ | 81 | 0.40 |
| 16 | $Pr_2O_3$ | 75 | 0.35 |
| 17 | $Nd_2O_3$ | 88 | 0.45 |
| 18 | $Sm_2O_3$ | 62 | 0.40 |
| 19 | $Eu_2O_3$ | 55 | 0.35 |
| 20 | $Gd_2O_3$ | 45 | 0.55 |
| 21 | $Tb_2O_3$ | 61 | 0.70 |
| 22 | $Dy_2O_3$ | 79 | 0.60 |
| 23 | $Ho_2O_3$ | 75 | 0.40 |
| 24 | $Er_2O_3$ | 82 | 0.40 |
| 25 | $Tm_2O_3$ | 77 | 0.50 |
| 26 | $Yb_2O_3$ | 43 | 0.65 |
| 27 | $Lu_2O_3$ | 34 | 0.70 |
| 28 | Type A zeolite | 415 | 0.20 |
| 29 | Type X zeolite | 253 | 0.30 |
| 30 | Type Y zeolite | 325 | 0.25 |
| 31 | Mordenite | 151 | 0.35 |
| 32 | ZSM-5 | 132 | 0.20 |
| 33 | Type β zeolite | 255 | 0.30 |
| 34 | Silica alumina | 212 | 0.15 |

EXAMPLE 2

Mixtures of an alumina powder with a saturated aqueous solution of cerium nitrate were placed in an electric oven, sintered at 500° C. for 1 hour in air, to complicate alumina with Ce. Then, the mixing ratios of an alumina powder with an aqueous cerium nitrate solution were varied corresponding to the compositions of the metal oxides shown in Table 2 to prepare samples 35 to 37 having compositions shown in Table 2.

The samples were molded into pellets having a diameter of 6 mm and a height of 3 mm, then, these pellets were mixed into a 4 wt % solution of dinitrodiammineplatinum ($Pt(NO_2)_2(NH_3)_2$) in nitric acid, and sintered in an electric oven at 500° C. for 1 hour in air to prepare CO shifting catalyst body comprising samples 35 to 37.

Then, the CO shifting catalyst bodies were filled into the hydrogen refinement apparatus shown in FIG. 1, the reformed gas was fed, and the CO concentrations after passing through the CO shifting catalyst bodies 6a were measured by gas chromatography, in the same manner as in Example 1. The results are shown in Table 2.

EXAMPLE 3

Ammonia was added to a saturated aqueous solution of cerium nitrate to cause co-precipitation, and the product was sintered in an electric oven at 500° C. for 1 hour in air atmosphere, to prepare a sample 38 (cerium oxide). Then, zirconyl nitrate and cerium nitrate were mixed corresponding to the compositions of metal oxides shown in Table 2 and ammonia was added thereto for co-precipitation to prepare samples 39 and 40.

These samples were molded into pellets having a diameter of 6 mm and a height of 3 mm, then, mixed into a 4 wt % solution of dinitrodiammineplatinum ($Pt(NO_2)_2(NH_3)_2$) in nitric acid in the same manner as in Example 1. Then, these mixtures were sintered in an electric oven at 500° C. for 1 hour in air atmosphere to prepare CO shifting catalyst bodies comprising samples 38 to 41. They were filled as the CO shifting catalyst body 6a into the hydrogen refinement apparatus shown in FIG. 1, the reformed gas was fed, and the CO concentrations after passing through the CO shifting catalyst bodies 6a were measured by gas chromatography, in the same manner as in Example 1. The results are shown in Table 2.

This hydrogen refinement apparatus was operated for 2000 0 hours, and the CO concentrations after passing through the CO shifting catalyst bodies 6a were measured again, to find that the CO concentrations after passing through the CO shifting catalyst bodies 6a when the samples 38, 39 and 40 were used were 0.19%, 0.15% and 0.15% respectively.

TABLE 2

| Sample No. | (Composite) Metal oxide | BET specific surface area ($m^2/g$) | CO conc. (%) |
|---|---|---|---|
| 35 | $Al_9CeO_x$ | 115 | 0.18 |
| 36 | $Al_5Ce_5O_x$ | 100 | 0.17 |
| 37 | $Al_3Ce_7O_x$ | 90 | 0.16 |
| 38 | $CeO_2$ | 80 | 0.13 |
| 39 | $Ce_9ZrO_x$ | 85 | 0.14 |
| 40 | $Ce_7Zr_3O_x$ | 90 | 0.15 |
| 41 | $CeZr_4O_x$ | 88 | 0.15 |

EXAMPLE 4

The CO shifting catalyst bodies 6a were produced in the manner as in Example 1 except that cerium oxide carriers having different BET specific surface areas as shown in Table 3 were produced by controlling the sintering temperature. Then, the reformed gas was fed to the CO shifting catalyst bodies 6a, and the CO concentrations of the shifted gas after passing through the CO shifting catalyst bodies 6a were measured by gas chromatography, in the same manner as in Example 1. Also after operation of the hydrogen generating apparatus for 1000 hours continuously, the CO concentrations of the shifted gas after passing through the CO shifting catalyst bodies 6a were measured by gas chromatography. The results are shown in Table 3.

TABLE 3

| Sample No. | (Composite) Metal oxide | BET specific surface area ($m^2/g$) | CO conc. (%) | CO conc. after 1000 hours (%) |
|---|---|---|---|---|
| 38a | $CeO_2$ | 7 | 3.2 | 3.2 |
| 38b | $CeO_2$ | 9 | 1.8 | 1.8 |
| 38c | $CeO_2$ | 12 | 0.45 | 0.45 |
| 38 | $CeO_2$ | 80 | 0.13 | 0.14 |
| 38d | $CeO_2$ | 240 | 0.14 | 0.14 |
| 38e | $CeO_2$ | 310 | 0.66 | 0.66 |
| 38f | $CeO_2$ | 390 | 0.09 | 0.89 |

EXAMPLE 5

The CO shifting catalyst bodies (samples 38 g and 38h) were produced in the same manner as in the case of the CO shifting catalyst body (sample 38) of example 2, except that cerium oxide was obtained by employing cerium carbonate or cerium hydroxide in place of cerium nitrate. Then, the reformed gas was fed to the CO shifting catalyst bodies 6a in the same manner as in example 1, and the CO concentrations after passing through the CO shifting catalyst bodies 6a were measured by gas chromatography. The results were 0.16% in case of sample 38g and 0.18% in case of 38h.

Comparative Example 1

The metal oxides shown in Table 4 were produced by heating alumina in an electric oven. These metal oxides were molded into pellets having a diameter of 6 mm and a height of 3 mm, then, these pellets were mixed into a 4 wt % solution of dinitrodiammineplatinum ($Pt(NO_2)_2(NH_3)_2$) in nitric acid. These mixtures were sintered in an electric oven at 500° C. for 1 hour in air atmosphere to prepare CO shifting catalyst bodies (samples 42 to 46).

Then, they were filled as the CO shifting catalyst bodies 6a the hydrogen refinement apparatus shown in FIG. 1, the reformed gas was fed, and the CO concentrations after passing through the CO shifting catalyst bodies 6a were measured by gas chromatography, in the same manner as in Example 1. The results are shown in Table 4.

TABLE 4

| Sample No. | (Composite) Metal oxide | BET specific surface area ($m^2/g$) | CO conc. (%) |
| --- | --- | --- | --- |
| 42 | $Al_2O_x$ | 0.9 | 9.5 |
| 43 | $Al_2O_x$ | 9.5 | 1.8 |
| 44 | $Al_2O_x$ | 9 | 5 |
| 45 | $Al_2O_x$ | 0.9 | 9.5 |
| 46 | $Al_2O_x$ | 8.5 | 3.0 |

EXAMPLE 6

Alumina, sample 2 produced in Example 1 was molded into a pellet having a diameter of 6 mm and a height of 3 mm, then, this molded article was mixed into a solution prepared by mixing a Pd salt, Rh salt or Ru salt in given ratio into a 4 wt % solution of dinitrodiammineplatinum ($Pt(NO_2)_2(NH_3)_2$) in nitric acid, these mixtures were sintered in an electric oven at 500° C. for 1 hour in air atmosphere to prepare CO shifting catalyst bodies (samples 47 to 61) shown in Table 5. These CO shifting catalyst bodies comprising samples 47 to 61 were used as the CO shifting catalyst bodies 6a in the hydrogen refinement apparatus shown in FIG. 1, and evaluated, in the same manner as in Example 1. The results are shown in Table 5.

TABLE 5

| Sample No. | Noble Metal added | Weight per 1 g of Pt | CO conc. (%) | Methane conc. (%) |
| --- | --- | --- | --- | --- |
| 47 | Pd | 0.08 | 0.20 | 0.01 |
| 48 | Pd | 0.1 | 0.17 | 0.01 |
| 49 | Pd | 0.3 | 0.15 | 0.02 |
| 50 | Pd | 0.5 | 0.16 | 0.04 |
| 51 | Pd | 0.6 | 0.50 | 1.8 |
| 52 | Rh | 0.08 | 0.20 | 0.01 |
| 53 | Rh | 0.1 | 0.18 | 0.01 |
| 54 | Rh | 0.3 | 0.17 | 0.04 |
| 55 | Rh | 0.5 | 0.13 | 0.08 |
| 56 | Rh | 0.6 | 0.60 | 3.01 |
| 57 | Ru | 0.08 | 0.20 | 0.01 |
| 58 | Ru | 0.1 | 0.15 | 0.01 |
| 59 | Ru | 0.3 | 0.13 | 0.04 |
| 60 | Ru | 0.5 | 0.16 | 0.09 |
| 61 | Ru | 0.6 | 0.80 | 4.05 |

EXAMPLE 7

The sample 2 comprising platinum supported by the alumina pellet in Example 1 was filled in the hydrogen refinement apparatus shown in FIG. 1 as the CO shifting catalyst body 6a. 50 liter/min. of methane and 150 liter/min. of water vapor were introduced at the raw material feeding part 1, and they were heated by the heating burner 4 so that the temperature of the reforming catalyst body 3a reached about 800° C. to cause reaction. The produced gas after passing through the reforming catalyst body 3a was measured by gas chromatography to find that it contained, excepting water vapor, about 80% of hydrogen, about 11% of CO, about 9% of carbon dioxide, and 300 ppm of methane. When this reformed gas was passed through the CO shifting catalyst body 6a, the CO concentration changed to about 0.20%, and air was introduced through the air feeding part 10 so as to obtain an oxygen concentration of 2% to cause a reaction over the CO purifying catalyst body 11, to obtain a CO concentration of 5 ppm.

The hydrogen generating apparatus was once stopped, and started-up again. This stopping and starting-up operation was repeated 1200 times, and the reformed gas composition was measured to find that the CO concentration after passing through the reforming catalyst body 3a was 11%, which had not changed, and after passing through the CO shifting catalyst body 6a, the CO concentration was 0.22%, and after passing through the CO purifying catalyst body 11, the CO concentration was 6 ppm.

Comparative Example 2

A commercially available copper-zinc-based CO shifting catalyst (C18 manufactured by Toyo CCI) in the form of a pellet having a diameter of 6 mm and a height of 3 mm was filled in the hydrogen refinement apparatus shown in FIG. 1 as the CO shifting catalyst body 6a. 50 liter/min. of methane and 150 liter/min. of water vapor were introduced at the raw material feeding part 1, and they were heated by the heating burner 4 so that the temperature of the reforming catalyst body 3a reached about 800° C. to cause reaction. The produced gas after passing through the reforming catalyst body 3a was measured by gas chromatography to find that it contained, excepting water vapor, about 80% of hydrogen, about 11% of CO, about 9% of carbon dioxide, and 300 ppm of methane. When this reformed gas was passed through the CO shifting catalyst body 6a, the CO concentration changed to about 0.11%, and air was introduced through the air feeding part 10 so as to obtain an oxygen concentration of 2% to cause a reaction over the CO purifying catalyst body 11, to obtain a CO concentration of 11 ppm.

The hydrogen generating apparatus was once stopped, and started-up again. This stopping and starting-up movement was repeated 1200 times, and the reformed gas composition was measured to find that the CO concentration after passing through the reforming catalyst body 3a was 11%, which had not changed, and after passing through the CO shifting catalyst body 6a, the CO concentration was 1.52%, and after passing through the CO purifying catalyst body 11, the CO concentration was 520 ppm.

As apparent from comparison between the above-mentioned evaluation results of the examples and comparative examples, according to the present invention, a hydrogen purification apparatus can be provided in which the heat resistance of a CO shifting catalyst body is improved, and which operate stably even if stopping and starting-up of the apparatus is repeated.

What is claimed is:

1. A hydrogen refinement apparatus comprising a source of reformed gas containing at least a hydrogen gas, carbon monoxide and water vapor, and a reaction chamber equipped with a carbon monoxide shifting catalyst body positioned downstream from said reformed gas source,
   wherein said carbon monoxide shifting catalyst body comprises a carrier composed of at least one oxide of a metal selected from the group consisting of Ce, Zr and Ti, having a BET specific surface area of at leas 10 $m^2/g$ and Pt supported thereon, such that carbon monoxide in said reformed gas is capable of being reduced by a shift reaction in said reaction chamber.

2. The hydrogen refinement apparatus in accordance with claim 1, wherein the BET specific surface area of said carrier is 250 $m^2/g$ or less.

3. The hydrogen refinement apparatus in accordance with claim 1, wherein said metal oxide contains Ce.

4. The hydrogen refinement apparatus in accordance with claim 3, wherein said metal oxide contains Zr.

5. A hydrogen refinement apparatus in accordance with claim 1, wherein said carbon monoxide shifting catalyst body comprises a carrier supporting Pd, Rh or Ru in an amount of 0.1 to 0.5 fold by weight based on Pt, in addition to Pt.

6. The hydrogen refinement apparatus of claim 1, wherein the carrier is in a form of pellets.

7. The hydrogen refinement apparatus of claim 6, wherein the pellets are located inside a column.

8. The hydrogen refinement apparatus of claim 1, wherein a surface of the carrier is composed of a slurry coating of a heat-resistant metal material.

9. The hydrogen refinement apparatus of claim 8, wherein the metal material is selected from the group consisting of cordierite and mullite.

10. The hydrogen refinement apparatus of claim 1, wherein the carrier is in a form of a honeycomb.

11. A method for operating a hydrogen refinement apparatus comprising a source of reformed gas containing at least a hydrogen gas, carbon monoxide, and water vapor and a reaction chamber equipped with a carbon monoxide shifting catalyst body positioned downstream front said reformed gas source; said carbon monoxide shifting catalyst body comprising a carrier composed of at least one oxide of a metal selected from the group consisting of Ce, Zr and Ti, having a BET specific surface area of at least 10 $m^2/g$ and Pt supported thereon,
    comprising the steps of controlling the temperature of said carbon monoxide shifting catalyst body front 150 to 450° C. and reducing carbon monoxide in said reformed gas by a shift reaction in said reaction chamber.

12. The method for operating a hydrogen refinement apparatus in accordance with claim 11, further comprising the step of controlling the temperature of the upstream side part of said carbon monoxide shifting catalyst body to more than the temperature of the downstream side part thereof.

13. The method for operating a hydrogen refinement apparatus in accordance with claim 11, wherein said reformed gas contains 24 to 50% by volume of water vapor.

14. The method of claim 11, further comprising the step of feeding water vapor such that an amount of water vapor contained in said reformed gas is from 24% to 50% by volume.

* * * * *

UNITED STATES PATENT AND TRADEMARK OFFICE
CERTIFICATE OF CORRECTION

PATENT NO.    : 6,846,475 B1
DATED         : January 25, 2005
INVENTOR(S)   : Kiyoshi Taguchi et al.

It is certified that error appears in the above-identified patent and that said Letters Patent is hereby corrected as shown below:

Column 13,
Line 20, "leas" should read -- least --;

Column 14,
Line 14, "front" should read -- from --.

Signed and Sealed this

Thirty-first Day of May, 2005

JON W. DUDAS
*Director of the United States Patent and Trademark Office*